(12) United States Patent
Hayano et al.

(10) Patent No.: US 9,552,904 B2
(45) Date of Patent: Jan. 24, 2017

(54) COMPOSITION CONTAINING NANO-CARBON MATERIAL AND A POLYETHER-BASED POLYMER CONTAINING OXIRANE UNITES HAVING A CATIONIC GROUP

(75) Inventors: Shigetaka Hayano, Tokyo (JP); Tsutomu Nagamune, Tsukuba (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/123,884

(22) PCT Filed: Jun. 28, 2012

(86) PCT No.: PCT/JP2012/066611
§ 371 (c)(1),
(2), (4) Date: Jan. 2, 2014

(87) PCT Pub. No.: WO2013/005653
PCT Pub. Date: Jan. 10, 2013

(65) Prior Publication Data
US 2014/0138589 A1    May 22, 2014

(30) Foreign Application Priority Data
Jul. 6, 2011  (JP) .................................. 2011-150119

(51) Int. Cl.
| H01B 1/24 | (2006.01) |
| B82Y 30/00 | (2011.01) |
| C08K 3/04 | (2006.01) |
| C08K 7/24 | (2006.01) |
| C01B 31/02 | (2006.01) |
| B82Y 40/00 | (2011.01) |
| C08G 65/14 | (2006.01) |
| C08G 65/24 | (2006.01) |
| C08G 65/333 | (2006.01) |
| C08G 65/00 | (2006.01) |

(52) U.S. Cl.
CPC ................ *H01B 1/24* (2013.01); *B82Y 30/00* (2013.01); *B82Y 40/00* (2013.01); *C01B 31/0273* (2013.01); *C08G 65/14* (2013.01); *C08G 65/24* (2013.01); *C08G 65/33317* (2013.01); *C08K 3/04* (2013.01); *C08K 7/24* (2013.01); *C08G 2261/12* (2013.01); *C08L 2205/05* (2013.01)

(58) Field of Classification Search
CPC ...... C08L 71/02; C08L 2205/05; C01B 31/02; C01B 31/0273; C08K 3/04; C08K 7/24; H01B 1/24; B82Y 30/00; B82Y 40/00; C08G 65/14; C08G 65/24; C08G 65/33317; C08G 2261/12
USPC .................................................. 252/511, 500
See application file for complete search history.

(56) References Cited

U.S. PATENT DOCUMENTS

| 2006/0047054 A1 | 3/2006 | Wang et al. |
| 2012/0296049 A1 | 11/2012 | Yonemaru et al. |
| 2013/0214209 A1 | 8/2013 | Hayano et al. |

FOREIGN PATENT DOCUMENTS

| JP | 2003342483 A | * 12/2003 |
| JP | A-2003-342483 | 12/2003 |
| JP | 2004035868 A | * 2/2004 |
| JP | A-2004-035868 | 2/2004 |
| JP | A-2011-132362 | 7/2011 |
| WO | 03/060002 A1 | 7/2003 |
| WO | WO 2009/102077 A1 | 8/2009 |
| WO | WO 2011/081152 A1 | 7/2011 |
| WO | WO 2012/057299 A1 | 5/2012 |

OTHER PUBLICATIONS

Bokobza et al., "Blends of Carbon Blacks and Multiwall Carbon Nanotubes as Reinforcing Fillers for Hydrocarbon Rubbers," *Journal of Polymer Science: Part B: Polymer Physics*, vol. 46, pp. 1939-1951, 2008.
Bokobza et al., "Carbon Nanotubes: Exceptional Reinforcing Fillers for Silicone Rubbers," *Raw Materials and Applications*, pp. 112-117, 2009.
International Search Report issued in Application No. PCT/JP2012/066611; Dated Oct. 2, 2012 (With Translation).
Jan. 16, 2014 International Preliminary Report on Patentability issued in International Patent Application No. PCT/JP2012/066611.
Jan. 12, 2015 Supplementary Search Report issued in European Patent Application No. 12807193.3.
Nov. 30, 2015 extended European Search Report issued in Application No. 15180888.8.

* cited by examiner

*Primary Examiner* — Mark Kopec
*Assistant Examiner* — Danny N Kang
(74) *Attorney, Agent, or Firm* — Oliff PLC

(57) ABSTRACT

A composition in accordance with the present invention contains a nano-carbon material, such as a carbon nanotube, and a polyether-based polymer containing oxirane monomer units at least part of which are oxirane monomer units each having a cationic group.

6 Claims, No Drawings

COMPOSITION CONTAINING NANO-CARBON MATERIAL AND A POLYETHER-BASED POLYMER CONTAINING OXIRANE UNITES HAVING A CATIONIC GROUP

TECHNICAL FIELD

The present invention relates to a composition containing a nano-carbon material and a polymer. More specifically, the preset invention relates to a composition which exhibits extremely excellent electric conductivity due to a nano-carbon material such as a carbon nanotube being well dispersed in a polymer.

BACKGROUND ART

A nano-carbon material such as a carbon nanotube has excellent electric conductivity. In addition, the nano-carbon material has excellent heat conductivity, mechanical strength, and the like. Therefore, it is expected that the nano-carbon material is applied in a wide range of fields.

As one of applications of the nano-carbon material, it is considered to mix the nano-carbon material with a polymer material for a purpose of considerably improving properties, such as electric conductivity, heat conductivity, and mechanical strength, of the polymer material. For example, Non Patent Literature 1 discusses mixing a multi-walled carbon nanotube with styrene-butadiene rubber so as to give electric conductivity to the styrene-butadiene rubber while improving mechanical strength of the styrene-butadiene rubber. Further, Non Patent Literature 2 discusses mixing, as a reinforcing material, the multi-walled carbon nanotube with poly(dimethylsiloxane) so as to improve mechanical strength of poly(dimethylsiloxane).

However, the nano-carbon material has such a tendency that the nano-carbon material is poor in affinity with the polymer material. Therefore, there is a problem that the nano-carbon material is extremely difficult to be evenly dispersed in the polymer material. For this reason, as described in Non Patent Literature 1, it has been often seen that properties, such as electric conductivity, of a composition prepared by mixing the nano-carbon material with the polymer material are not so different from those of a composition prepared by mixing a carbon black with the polymer material. Accordingly, it has been hard to say that the excellent properties of the nano-carbon material are sufficiently demonstrated. In view of this, it has been desired to develop a polymer material which allows a nano-carbon material to be easily dispersed in a composition and which accordingly allows the composition to exhibit excellent electric conductivity.

CITATION LIST

Non Patent Literature 1

Bokobza and four others, "Blends of Carbon Blacks and Multiwall Carbon Nanotubes as Reinforcing Fillers for Hydrocarbon Rubbers", Journal of Polymer Science: Part B: Polymer Physics, 2008, Vol. 46, pp. 1939-1951

Non Patent Literature 2

Bokobza, Rahmani, "Carbon Nanotubes : Exceptional Reinforcing Fillers for Silicone Rubbers", RAW MATERIALS AND APPLICATIONS, 2009, pp. 112-117

SUMMARY OF INVENTION

Technical Problem

An object of the present invention is to provide a composition containing a polymer material and a nano-carbon material, the composition allowing the nano-carbon material to be well dispersed in the polymer material and accordingly exhibiting extremely excellent electric conductivity.

Solution to Problem

The inventors of the present invention found, as a result of diligently devoting themselves to study in order to attain the above object, that a composition in which a carbon nanotube is well dispersed in a polyether-based polymer is prepared by (i) mixing, in a solvent, the carbon nanotube with the polyether-based polymer containing oxirane monomer units each having a cationic group and (ii) removing the solvent by drying a mixture thus obtained, and that the composition exhibits extremely excellent electric conductivity. The present invention has been made on the basis of this finding.

Thus, according to the present invention, a composition is provided which contains (i) a polyether-based polymer containing oxirane monomer units at least part of which are oxirane monomer units each having a cationic group and (ii) a nano-carbon material.

Advantageous Effects of Invention

According to the present invention, it is possible to prepare a composition containing a polyether-based polymer and a nano-carbon material, the composition exhibiting extremely excellent electric conductivity.

DESCRIPTION OF EMBODIMENTS

A composition of the present invention is a composition containing a specific polyether-based polymer and a nano-carbon material. The polyether-based polymer which constitutes the composition of the present invention is a polymer containing oxirane monomer units. The polymer containing oxirane monomer units is prepared by ring-opening polymerization in which compounds each having an oxirane structure is ring-opened to form the oxirane monomer units. At least part of the oxirane monomer units are necessarily oxirane monomer units each having a cationic group.

The cationic group of the oxirane monomer units each having a cationic group is not limited in particular. However, in view of preparing a composition which is excellent particularly in dispersibility of a nano-carbon material, the cationic group is preferably a cationic group having an onium salt structure containing an atom of the group 15 or 16 in the periodic table, more preferably a cationic group having a structure in which a nitrogen atom has become an onium salt, even more preferably a cationic group having a structure in which a nitrogen atom of a nitrogen atom-containing aromatic heterocycle has become an onium salt, most preferably a cationic group having an imidazolium ring structure. Specific examples of the cationic group, that is, a group having a cationic structure include: ammonium groups such as an ammonium group, a methylammonium group, a butylammonium group, a cyclohexylammonium group, an anilinium group, a benzylammonium group, an ethanolammonium group, a dimethylammonium group, a diethylammonium group, a dibutylammonium group, a nonylphenylammonium group, a piperidinium group, a trimethylammonium group, a triethylammonium group, an n-butyldimethylammonium group, an n-octyldimethylammonium group, an n-stearyldimethylammonium group, a tributylammonium group, a trivinylammonium group, a triethanolammonium group, an N,N'-dimethylethanolammonium group, and a tri(2-ethoxyethyl)ammonium group; a group which contains a heterocycle containing a cationic nitrogen atom, such as a 1-pyrrolidiniumu group, an imidazolium group, a 1-methylimidazolium group, a 1-ethylimidazolium group, a benzimidazolium group, a pyrrolium group, a 1 methylpyrrolium group, an oxazolium group, a benzoxazolium group, a benzisoxazolium group, a pyrazolium group, an isoxazolium group, a pyridinium group, a 2,6-dimethylpyridinium group, a pyrazium group, a pyrimidinium group, a pyridazium group, a triadium group, an N,N'-dimethylanilinium group, a quinolinium group, an isoquinolinium group, an indolium group, an isoindolium group, a quinoxalium group, and a thiazolium group; and a group containing a cationic phosphorus atom, such as a triphenylphosphonium group and a tributylphosphonium group. Preferable examples of the cationic group include an imidazolium group, a 1-methylimidazolium group, a 1-ethylimidazolium group, and a benzimidazolium group. However, the cationic group is not limited to such.

Note that the cationic group usually has a counter anion. However, a type of the counter anion is not limited in particular. Examples of the counter anion include:

halide ions such as $Cl^-$, $Br^-$, and $I^-$; sulfone imide ions such as $(FSO_2)_2N^-$, $(CF_3SO_2)_2N^-$, and $(CF_3CF_2SO_2)_2N^-$; $OH^-$; $SCN^-$; $BF4^-$; $PF_6^-$; $ClO_4^-$; $CH_3SO_3^-$; $CF_3SO_3^-$; $CF_3COO^-$; and $PhCOO^-$. Among those, a halide ion or a sulfone imide ion is preferably used, in view of preparing a composition which is excellent particularly in dispersibility of the nano-carbon material.

The oxirane monomer units each having a cationic group of the polyether-based polymer are not limited in particular in terms of its structure. However, the oxirane monomer units are each preferably a repeating unit represented by the following formula (1).

[Chem.]

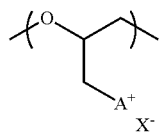
(1)

where A+ is a cationic group or a cationic group containing group, and $X^-$ is a counter anion.

It is only necessary that at least part of the oxirane monomer units constituting the polyether-based polymer be the oxirane monomer units each having a cationic group. That is, all of the oxirane monomer units constituting the polyether-based polymer may each have a cationic group. Alternatively, the oxirane monomer units constituting the polyether-based polymer may include the oxirane monomer units each having a cationic group and an oxirane monomer unit having no cationic group. A ratio of the oxirane monomer units each having a cationic group to the whole oxirane monomer units constituting the polyether-based polymer is not limited in particular. However, the ratio of the oxirane monomer units each having a cationic group to the whole oxirane monomer units is preferably selected, for example, in a range of 2 mol % to 100 mol %, more preferably in a range of 3 mol % to 100 mol %.

Specific examples of the oxirane monomer unit having no cationic group, which oxirane monomer unit may be contained in the polyether-based polymer, include: alkylene oxide units such as an ethylene oxide unit, a propylene oxide unit, and a 1,2-butylene oxide unit; epihalohydrin units such as an epichlorohydrin unit, an epibromohydrin unit, and an epiiodohydrin unit; alkenyl group containing oxirane monomer units such as an allyl glycidyl ether unit; and acrylic group containing oxirane monomer units such as a glycidyl acrylate unit. However, the oxirane monomer unit having no cationic group is not limited to such.

In a case where the polyether-based polymer contains two or more types of oxirane monomer units, a distribution pattern of such a plurality of repeating units is not limited in particular. However, the plurality of repeating units are preferably distributed at random.

A weight average molecular weight of the polyether-based polymer is not limited in particular. However, the weight average molecular weight of the polyether-based polymer is preferably 500 to 2,000,000, more preferably 1000 to 1,500,000. In a case where the weight average molecular weight of the polyether-based polymer was too high, a composition to be prepared would be possibly poor in formability. In a case where the weight average molecular weight of the polyether-based polymer was too low, a composition to be prepared would be possibly insufficient in mechanical strength.

Further, a chain structure of the polyether-based polymer is also not limited in particular. The polyether-based polymer may have a straight chain, a graft chain, or a chain structure having a branch, such as a radial chain.

A method for synthesizing the polyether-based polymer of the present invention is not limited in particular. Any synthesis method can be employed, provided that an intended polyether-based polymer can be prepared. However, in view of preparing an intended polyether-based polymer more easily, it is preferable to employ a method in which (i) an onium compound, such as an imidazole compound, is reacted with a polyether-based polymer containing a halogen group so that the halogen group is converted into an onium halide group and, if necessary, (ii) a halide ion which is a counter anion of the onium halide group is exchanged for the other counter anion by an anion exchange reaction.

Synthesis of the polyether-based polymer containing a halogen group can be carried out in accordance with a publicly known polymerization method or modification method. Further, in order to substitute the halogen group with the onium halide group by reacting the onium compound with the polyether-based polymer containing a halogen group, a publicly known onium-forming reaction can be applied. Examples of the onium-forming reaction are disclosed in "Japanese Patent Application Publication, Tokukaisho No. 50-33271", "Japanese Patent Application Publication, Tokukaisho No. 51-69434", "Japanese Patent Application Publication, Tokukaisho No. 52-42481", and the like. The anion exchange reaction can be carried out in accordance with a conventional procedure. For example, by causing a (bistrifluoromethylsulfone)imide anion to be in contact with a polyether-based polymer containing an onium halide group, it is possible to exchange the onium halide group for an onium(bistrifluoromethylsulfone)imide group.

Examples of a particularly preferable method for preparing the polyether-based polymer used in the present invention include the following method for producing a polyether-based polymer. That is, the method for producing a polyether-based polymer includes the steps of (1) preparing a polyether-based polymer containing a halogen group by subjecting a monomer composition containing a oxirane monomer having a halogen group to ring-opening polymerization in the presence of a catalyst, (2) preparing a polyether-based polymer having an onium halide structure by reacting the polyether-based polymer containing a halogen group thus prepared with an onium-forming agent, and, as an optional step, (3) replacing at least part of halide ions, each of which is a counter anion of the onium halide structure of the polyether-based polymer having an onium halide structure, with the other anions by causing a metal compound to be in contact with the polyether-based polymer having an onium halide structure thus prepared.

The step (1) of the method for producing a polyether-based polymer is a step of preparing a polyether-based polymer containing a halogen group by subjecting a monomer composition containing an oxirane monomer having a halogen group to ring-opening polymerization in the presence of a catalyst. Examples of the oxirane monomer having a halogen group include epichlorohydrin, epibromohydrin, and epiiodohydrin. Among those, epichlorohydrin is preferably used. Further, the monomer composition may contain a monomer other than the oxirane monomer having a halogen group. Specific examples of the monomer which may be contained in the monomer composition include an oxirane monomer having no halogen group, such as ethylene oxide, propylene oxide, 1,2-butylene oxide, and allyl glycidyl ether.

The catalyst used for the ring-opening polymerization of the monomer composition containing the oxirane monomer having a halogen group is not limited in particular, provided that an intended polymer can be prepared. Examples of the catalyst include: a catalyst prepared by reacting an organic aluminum compound with a phosphoric acid and a compound having Lewis basicity; and a catalyst, disclosed in "Japanese Patent Application Publication, Tokukai No. 2010-53217", which catalyst contains (i) an onium salt of a compound containing an atom of the group 15 or 16 in the periodic table and (ii) trialkylaluminum containing alkyl groups all of which are linear alkyl groups.

The catalyst prepared by reacting the organic aluminum compound with the phosphoric acid and the compound having Lewis basicity is more preferably used to prepare a polymer having a relatively large molecular weight. Specific examples of the organic aluminum compound used to prepare the catalyst include trimethylaluminum, triethylaluminum, tri-n-octyl aluminum, and triisobutylaluminum. Further, as the compound having Lewis basicity, which is reacted with the organic aluminum compound and the phosphoric acid, an organic compound containing an oxygen atom, a nitrogen atom or a phosphorus atom is preferably used. Specific examples of the compound having Lewis basicity include diethyl ether, dibutyl ether, tetrahydrofuran, acetone, methyl ethyl ketone, ethyl acetate, triethylamine, pyridine, acetonitrile, triphenylphosphine, and tributylphosphine.

An amount of each of the organic aluminum compound, the phosphoric acid, and the compound having Lewis basicity, which are used to prepare the catalyst, is not limited in particular. It is only necessary that the amount be determined in accordance with a molecular weight etc. of an intended polymer. However, a mole ratio of the organic aluminum/the phosphoric acid/the compound having Lewis basicity is preferably 1.0 to 3.0/1.0/0.1 to 30.0. Further, a method for reacting those components is not limited in particular. However, it is preferable to employ a method in which the components are dissolved or suspended in respective solvents and then solutions thus prepared are mixed together. The solvents to be used are not limited in particular. However, an inactive solvent is preferably used. Examples of the solvents include: aromatic hydrocarbons such as benzene and toluene; chain saturated hydrocarbons such as n-pentane and n-hexane; alicyclic hydrocarbons such as cyclopentane and cyclohexane; ethers such as tetrahydrofuran, anisole, and diethyl ether; and a mixed solvent of those listed solvents. A temperature at which those components are stirred or a time period for which those components are stirred is also not limited in particular. However, it is preferable to stir the components at a temperature of −30° C. to 50° C. for 10 seconds to 12 hours.

An amount of the catalyst prepared by reacting the organic aluminum compound with the phosphoric acid and the compound having Lewis basicity, which catalyst is used for the ring-opening polymerization of the monomer composition containing the oxirane monomer having a halogen group, is also not limited in particular. However, the amount of the catalyst is preferably selected in a range of 0.00005 mol % to 50 mol % with respect to a total mole number of the monomer composition to be used.

The catalyst, containing (i) the onium salt of the compound containing an atom of the group 15 or 16 in the periodic table and (ii) trialkylaluminum containing alkyl groups all of which are linear alkyl groups, allows the monomer composition containing the oxirane monomer having a halogen group to undergo the ring-opening polymerization with livingness. Therefore, the use of this catalyst makes it possible to control the polymerization easily, thereby making it possible to easily produce the polyether-based polymer with a desired polymerization degree. Examples of the onium salt of the compound containing an atom of the group 15 or 16 in the periodic table, which onium salt is one of components of the catalyst, include an ammonium salt, a pyridinium salt, an imidazolium salt, a phosphonium salt, an arsonium salt, a stibonium salt, an oxonium salt, a sulfonium salt, and a selenonium salt. Among those, the ammonium salt, the pyridinium salt, the imidazolium salt, the phosphonium salt, and the sulfonium salt are preferably used. More preferably, the ammonium salt, the phosphonium salt, and the sulfonium salt are used. Most preferably, the ammonium salt is used.

An amount of the onium salt of the compound containing an atom of the group 15 or 16 in the periodic table is not limited in particular. It is only necessary that the amount be determined in accordance with molecular weight etc. of an intended polymer. However, the amount of the onium salt is preferably selected in a range of 0.0005 mol % to 10 mol % with respect to the total mole number of the monomer composition.

Examples of trialkylaluminum containing alkyl groups all of which are linear alkyl groups, which trialkylaluminum is the other of the components of the catalyst, include trimethylaluminum, triethylaluminum, and tri-n-octyl aluminum. Among those, trimethylaluminum and triethylaluminum are most preferably used.

A ratio of the onium salt of the compound containing an atom of the group 15 or 16 in periodic table to trialkylaluminum containing alkyl groups all of which are linear alkyl groups is not limited in particular. However, the ratio of the onium salt to trialkylaluminum is preferably 1:1 through 1:100, more preferably 1.0:1.1 through 1.0:50.0, even more preferably 1.0:1.2 through 1.0:10.0.

A method for mixing the onium salt of the compound containing an atom of the group 15 or 16 in periodic table with trialkylaluminum containing alkyl groups all of which are linear alkyl groups is not limited in particular. However, it is preferable to employ a method in which the onium salt and trialkylaluminum are dissolved or suspended in respective solvents and then solutions thus prepared are mixed together. The solvents to be used are not limited in particular. However, an inactive solvent is preferably used. Examples of the solvents include:

aromatic hydrocarbons such as benzene and toluene; chain saturated hydrocarbons such as n-pentane and n-hexane; alicyclic hydrocarbons such as cyclopentane and cyclohexane; ethers such as tetrahydrofuran, anisole, and diethyl ether; or a mixed solvent of those listed solvents. A temperature at which the components of the catalyst are stirred or a time period for which the components of the catalyst are stirred is not limited in particular. However, it is preferable to stir the components at a temperature of −30° C. to 50° C. for 10 seconds to 30 minutes.

Further, a method for mixing the catalyst with the monomer composition containing the oxirane monomer having a halogen group, so as to polymerize the monomer composition in the presence of the catalyst, is not limited in particular. For example, the monomer composition may be added to a solvent containing the catalyst. Alternatively, the catalyst may be added to a solvent containing the monomer composition. Furthermore, a pattern of the polymerization is not limited in particular. However, in view of good control of the polymerization, it is preferable to polymerize the monomer composition by a solution polymerization method. As a solvent, an inactive solvent is preferably used. Examples of the solvent include: aromatic hydrocarbons such as benzene and toluene; chain saturated hydrocarbons such as n-pentane and n-hexane; alicyclic hydrocarbons such as cyclopentane and cyclohexane; ethers such as tetrahydrofuran, anisole, and diethyl ether; and a mixed solvent of those listed solvents. Among those solvents, a non-polar solvent is more preferably used because the non-polar solvent allows polymerization kinetics to be faster. An amount of the solvent is not limited in particular. However, the amount of the solvent is preferably arranged so that a concentration of the monomer composition is 1% to 50% by weight, more preferably 3% to 40% by weight.

A condition on which the polymerization is carried out is not limited in particular. It is only necessary that the condition be determined in accordance with a monomer to be used, a type of a catalyst to be used, molecular weight of an intended polymer, and the like. Pressure under which the polymerization is carried out is usually 1 atm to 500 atm, preferably 1 atm to 100 atm, more preferably 1 atm to 50 atm. A temperature at which the polymerization is carried out is usually −70° C. to 200° C., preferably −40° C. to 150° C., more preferably −20° C. to 100° C.

A time period for which the polymerization is carried out is usually 10 seconds to 100 hours, preferably 20 seconds to 80 hours, more preferably 30 seconds to 50 hours.

The step (2) of the method for producing a polyether-based polymer is a step of preparing a polyether-based polymer having an onium halide structure, for example, by reacting the polyether-based polymer containing a halogen group, prepared as above, with an onium-forming agent (quaternization reaction) so as to convert the halogen group into a group having an onium halide structure.

Examples of the onium-forming agent include: amines such as ammonia, methylamine, butylamine, cyclohexylamine, aniline, benzylamine, ethanolamine, dimethylamine, diethylamine, dibutylamine, nonylphenylamine, piperidine, trimethylamine, triethylamine, n-butyldimethylamine, n-octyldimethylamine, n-stearyldimethylamine, tributylamine, trivinylamine, triethanolamine, N,N'-dimethylethanolamine, and tri(2-ethoxyethyl)amine; heterocyclic compounds each containing a cationic nitrogen atom, such as 1-pyrrolidine, imidazole, 1-methylimidazole, 1-ethylimidazole, benzimidazole, pyrrole, 1-methylpyrrole, oxazole, benzoxazole, benzisoxazole, pyrazole, isoxazole, pyridine, 2,6-dimethylpyridine, pyrazine, pyrimidine, pyridazine, triazine, N,N' dimethylaniline, quinolone, isoquinoline, indole, isoindole, quinoxaline, and thiazole; and phosphorus compounds such as triphenylphosphine and tributylphosphine. Preferable examples of the onium-forming agent are imidazole, 1-methylimidazole, 1-ethylimidazole, and benzimidazole. However, the onium-forming agent is not limited to these.

A method for mixing the polyether-based polymer with the onium-forming agent is not limited in particular. For example, the following methods can be employed: a method in which the onium-forming agent is added to and mixed with a solution containing the polyether-based polymer; a method in which the polyether-based polymer is added to and mixed with a solution containing the onium-forming agent; and a method in which solutions of the onium-forming agent and the polyether-based polymer are prepared respectively and then the solutions are mixed with each other.

As such solvents, an inactive solvent is preferably used, and the inactive solvent can be a non-polar solvent or a polar solvent. Examples of the non-polar solvent include: aromatic hydrocarbons such as benzene and toluene; chain saturated hydrocarbons such as n-pentane and n-hexane; and alicyclic saturated hydrocarbons such as cyclopentane and cyclohexane. Examples of the polar solvent include: ethers such as tetrahydrofuran, anisole, and diethyl ether; esters such as ethyl acetate and ethyl benzoate; ketones such as acetone, 2-butanone, and acetophenone; polar aprotic solvents such as acetonitrile, dimethylformamide, and dimethylsulfoxide; and polar protic solvents such as ethanol, methanol, and water. A mixed solvent of those listed solvents is also preferably used as the solvent. An amount of the solvent is not limited in particular. However, the amount of the solvent is preferably arranged so that a concentration of the polyether-based polymer is 1% to 50% by weight, more preferably 3% to 40% by weight.

An amount of the onium-forming agent is not limited in particular. It is only necessary that the amount of the onium-forming agent be determined in accordance with a content ratio of the oxirane monomer units each having a cationic group and the like of an intended polyether-based polymer. Specifically, the amount of the onium-forming agent is usually 0.01 mol to 100 mol, preferably 0.02 mol to 50 mol, more preferably 0.03 mol to 10 mol, even more preferably 0.05 mol to 2 mol, where the halogen group of the polyether-based polymer is 1(one) mol.

Pressure under which the polyether-based polymer is reacted with the onium-forming agent is not limited in particular. The pressure is usually 1 atm to 500 atm, preferably 1 atm to 100 atm, more preferably 1 atm to 50 atm. Further, a temperature at which the polyether-based polymer is reacted with the onium-forming agent is not limited. The temperature is usually 0° C. to 200° C., preferably 20° C. to 170° C., more preferably 40° C. to 150° C. A time period for which the polyether-based polymer is reacted with the onium-forming agent is usually 1 minute to 1,000 hours, preferably 3 minutes to 800 hours, more preferably 5 minutes to 500 hours, even more preferably 30 minutes to 200 hours.

The polyether-based polymer having an onium halide structure thus prepared can be used, as it is, as a component of the composition of the present invention. Alternatively, if necessary, at least part of halide ions, each of which is a counter anion of the onium halide structure, may be exchanged for the other anions by causing a metal compound to be in contact with the polyether-based polymer having an onium halide structure.

The metal compound used for such an anion exchange reaction is not limited in particular. However, an alkali metal compound or an alkaline-earth metal compound, each of which has an anion to be introduced, is preferably used as the metal compound.

A condition on which the anion exchange reaction is carried out is not limited in particular. The anion exchange reaction may be carried out by mixing only the polyether-based polymer and the metal compound. Alternatively, the anion exchange reaction can be carried out in the presence of the other compound such as an organic solvent. Further, an amount of the metal compound is not limited in particular. However, the amount of the metal compound is usually 0.01 mol to 100 mol, preferably 0.02 mol to 50 mol, more preferably 0.03 mol to 10 mole, where the onium halide structure of the polyether-based polymer to be used is 1(one) mol.

Pressure under which the anion exchange reaction is carried out is usually 1 atm to 500 atm, preferably 1 atm to 100 atm, more preferably 1 atm to 50 atm. A temperature at which the anion exchange reaction is carried out is usually −30° C. to 200° C., preferably −15° C. to 180° C., more preferably 0° C. to 150° C. A time period for which the anion exchange reaction is carried out is usually minute to 1000 hours, preferably 3 minutes to 100 hours, more preferably 5 minutes to 10 hours, even more preferably 5 minutes to 3 hours.

After an end of the anion exchange reaction, it is only necessary to collect an intended polyether-based polymer in accordance with a conventional procedure such as reduced-pressure drying.

The composition of the present invention can be prepared, for example, by mixing a nano-carbon material with the polyether-based polymer prepared as above. Examples of the nano-carbon material that can be used in the present invention include a graphene sheet, a carbon nanotube, a carbon nanohorn, and a nano graphene. Among those, the carbon nanotube is most preferably used. The carbon nanotube is a nano-carbon material having a structure in which a graphene sheet is rolled into a cylinder. The carbon nanotube is roughly classified into a single-walled nanotube and a multi-walled nanotube, depending on the number of peripheral walls of the carbon nanotube. Furthermore, the carbon nanotube is classified into a chiral carbon nanotube, a zigzag carbon nanotube, an armchair carbon nanotube, and the like, depending on a structure of the graphene sheet. According to the present invention, any carbon nanotube can be used as the nano-carbon material. However, a single-walled carbon nanotube prepared by a super-growth method (a single-walled carbon nanotube prepared by a method disclosed in International Application Publication, No. WO 2006/011655), which single-walled carbon nanotube is known to have a high aspect ratio, is most preferably used.

According to the composition of the present invention, a content ratio of the polyether-based polymer to the nano-carbon material is not limited in particular.

However, in view of well dispersing the nano-carbon material so as to effectively prepare a composition having excellent electric conductivity, an amount of the nano-carbon material is preferably 0.01 parts to 30 parts by weight, more preferably 0.02 parts to 20 parts by weight, where an amount of the polyether-based polymer is 100 parts by weight.

A method for mixing the nano-carbon material with the polyether-based polymer so as to prepare the composition of the present invention is not limited in particular. However, it is preferable to mix the nano-carbon material with the polyether-based polymer by a method including the combined steps of (i) mincing the nano-carbon material and (ii) mixing the polyether-based polymer with the nano-carbon material thus minced. A method for mincing the nano-carbon material is not limited in particular, and a publicly known mincing method can be employed, such as (a) a method in which the nano-carbon material is minced by applying a shear force to the nano-carbon material by a mill or a kneading machine and (b) a method in which the nano-carbon material is minced by an ultrasonic wave. Note that an order of the step of mincing the nano-carbon material and the step of mixing the polyether-based polymer with the nano-carbon material thus mincing is not limited in particular. For example, after the nano-carbon material is minced, the nano-carbon material thus minced can be mixed with the polyether-based polymer by a method described later. Alternatively, after a composition is prepared by mixing the nano-carbon material with the polyether-based polymer by a method described later, the nano-carbon material can be minced by applying a mincing step to the composition.

In the step of mixing the nano-carbon material with the polyether-based polymer, a method for mixing the nano-carbon material and the polyether-based polymer is not specifically limited in particular. However, those components are preferably mixed in a solvent. In a case where the components are mixed in a solvent, a solvent to be used is not limited in particular. However, a polar solvent is preferably used, in view of preparing a composition in which the nano-carbon material is well dispersed. Examples of the polar solvent include: ethers such as tetrahydrofuran and anisole; esters such as ethyl acetate and ethyl benzoate; ketones such as acetone, 2-butanone, and acetophenone; polar aprotic solvents such as acetonitrile, dimethylformamide, dimethylsulfoxide, and N-methylpyrrolidone; and polar protic solvents such as ethanol, methanol, and water. Each of these solvents can be used solely. Alternatively, two or more of these solvents can be used in combination as a mixed solvent. An amount of the solvent is not limited in particular. However, the amount of the solvent is preferably selected so that respective concentrations of the nano-carbon material and the polyether-based polymer in the solvent are in a range of 0.1% to 50% by weight.

A method for mixing the nano-carbon material with the polyether-based polymer in a solvent is not limited in particular. The polyether-based polymer can be added to a solution in which the nano-carbon material is suspended. Alternatively, the nano-carbon material can be added to a solution in which the polyether-based polymer is dissolved in a solvent. The nano-carbon material and the polyether-based polymer can be mixed with each other by stirring them with the use of a general stirrer. Alternatively, the nano-carbon material and the polyether-based polymer can be mixed with each other by use of an ultrasonic disperser. A solution obtained by mixing the nano-carbon material with the polyether-based polymer can be used, as it is, as the composition of the present invention. However, the composition is preferably used in a solid state by removing the solvent from the solution. A method for removing the solvent from the solution is not limited in particular. For example, the solvent can be removed by evaporating the solvent. Alternatively, the solvent can be dried off, thereby solidifying the solution.

The composition of the present invention can contain only the nano-carbon material and the polyether-based polymer. However, the composition can further contain the other component. The other component which can be contained in the composition of the present invention is not limited in particular. Specific examples of the other component include: polymer materials other than the specific polyether-based polymer used in the present invention; carbon; inorganic oxides such as silica, titania, and alumina; metal microparticles such as gold, silver, platinum, nickel, copper, and aluminum; and, inorganic fibers such as a glass fiber and a carbon fiber. Further, the composition of the present invention can be arranged to be cross-linkable by adding thereto a cross-linking agent and, as necessary, a cross-linking aid or a cross-linking promoter. By arranging the composition of the present invention to be cross-linkable and cross-linking the composition of the present invention so that the composition is a cross-linked material, it is possible to considerably improve mechanical strength of the composition of the present invention as a structural material while maintaining extremely excellent electric conductivity of the composition of the present invention.

The polymer materials which can be contained in the composition of the present invention apart from the specific polyether-based polymer used in the present invention are not limited in particular. Examples of the polymer materials include: polyether-based polymers other' than the specific polyether-based polymer used in the present invention; rubber materials such as NBR, SBR, BR, IR, acrylic rubber, and EPR; thermoplastic elastomer materials such as SIS, SBS, and SEBS; resin materials such as PMMA, polyethylene, polypropylene, polystyrene, polycarbonate, ABS, vinyl chloride, and PET; and photo-curable or heat-curable resins such as an epoxy resin, an urethane resin, and a heat-curable or photo-curable acrylate resin. Note that, according to the composition of the present invention, it is possible to well disperse the nano-carbon material, even in a case where a polymer material which is basically poor in affinity with a nano-carbon material is contained in the composition of the present invention. The reason for this is not exactly clear, but it is considered that the polyether-based polymer, which is an essential component, serves sort of a binder because the polyether-based polymer has excellent affinity with both the nano-carbon material and the polymer material.

The cross-linking agent, which can be contained in a case where the composition of the present invention is arranged to be cross-linkable, is not limited in particular.

The cross-linking agent is only necessary to be selected depending on a structure and the like of a polymer to be used. Examples of the cross-linking agent include: sulfur such as powdered sulfur, precipitated sulfur, colloidal sulfur, insoluble sulfur, and highly-dispersive sulfur; sulfur-containing compounds such as sulfur monochloride, sulfur dichloride, morpholine disulfide, alkylphenol disulfides, dibenzothiazyl disulfide, N,N'-dithiobis(hexahydro-2H-azepinone-2), phosphorus-containing polysulfides, and polysulfide; organic peroxides such as dicumylperoxide, and ditertiary butyl peroxide; quinonedioximes such as p-quinonedioxime and p,p'-dibenzoyl quinonedioxime; organic polyamine compounds such as triethylenetetramine, hexamethylenediamine carbamate, 4,4'-methylenebis-o-chloroaniline, and trimercaptotriazine; and alkylphenol resins having a methylol group. Among these cross-linking agents, sulfur and the sulfur-containing compounds are preferably used. Each of these cross-linking agents can be used solely. Alternatively, two or more of these cross-linking agents can be used in combination. A ratio of the cross-linking agent to the composition is not limited in particular. However, the cross-linking agent is preferably 0.1 parts to 10 parts by weight, more preferably 0.2 parts to 7 parts by weight, even more preferably 0.3 parts to 5 parts by weight, where the composition (in whole) is 100 parts by weight.

In a case where the cross-linking agent is sulfur or a sulfur-containing compound, it is preferable to use a cross-linking aid and a cross-linking promoter. The cross-linking aid is not limited in particular. Examples of the cross-linking aid include a zinc flower and stearic acid. The cross-linking promoter is not limited in particular. As the cross-linking promoter, cross-linking promoters can be used such as a guanidine series, an aldehyde-amine series, an aldehyde-ammonia series, a thiazole series, a sulfenamide series, a thiourea series, and a thiuram series. Two or more of such cross-linking aids can be used in combination. Further, two or more of such cross-linking promoters can be used in combination.

An amount of each of the cross-linking aid and the cross-linking promoter is not limited in particular. However, the amount of each of the cross-linking aid and the cross-linking promoter is preferably 0.01 parts to 15 parts by weight, more preferably 0.1 parts to 10 parts by weight, where the composition (whole composition) is 100 parts by weight.

According to the composition of the present invention as has been described, it is possible to well disperse the nano-carbon material in the polyether-based polymer. This allows the composition of the present invention to exhibit extremely excellent electric conductivity. Therefore, it is possible to preferably use the composition of the present invention as a material of an electric or electronic product, an architectural material, a medical material, and the like. As has been described, the composition of the present invention is preferably arranged such that the oxirane monomer units each having a cationic group of the polyether-based polymer are each a unit represented by the following formula (1).

[Chem.]

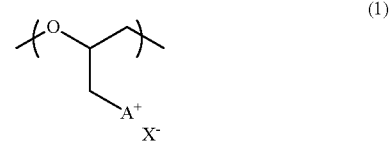

where A+ is a cationic group or a cationic group containing group, and X⁻ is a counter anion.

The composition of the present invention is preferably arranged such that the nano-carbon material is a carbon nanotube.

EXAMPLES

The following Examples and Comparative Example will discuss the present invention more specifically. Note that "part" and "%" in Examples are each based on weight, unless otherwise noted.

Further, measurement and evaluation in each of Examples were carried out as follows.

(1) Weight Average Molecular Weight

Weight average molecular weight was measured in terms of polystyrene by gel permeation chromatography (GPC) in which a solvent was dimethylformamide. Note that the GPC was conducted by use of HLC-8320 (produced by Tosoh Corporation) as a measuring instrument, two TSKgelα-M (produced by TOSOH CORPORATION) connected in series as a column, and a differential refractometer RI-8320 (produced by Tosoh Corporation) as a detector.

(2) Content Ratio of Oxirane Monomer Units each having a Cationic Group

A content ratio of oxirane monomer units each having a cationic group of a polyether-based polymer was measured as below by use of a nuclear magnetic resonance apparatus (NMR). 30 mg of polyether-based polymer, serving as a sample, was added to 1.0 mL of deuterated chloroform, and then a mixture thus obtained was shaken for one hour so that the polyether-based polymer was uniformly dissolved in the deuterated chloroform. Then, the NMR measurement was carried out with respect to a solution thus obtained, so that a $^1$H-NMR spectrum was obtained. The content ratio of the oxirane monomer units each having a cationic group of the polyether-based polymer was then calculated as below. First, a mole number B1 of all of oxirane monomer units was calculated from an integrated value of protons derived from the oxirane monomer units in a main chain. Next, a mole number B2 of the oxirane monomer units each having a cationic group was calculated from an integrated value of protons derived from cationic groups. Then, a ratio of the mole number B2 to the mole number B1 (percentage) was calculated as a content ratio of the oxirane monomer units each having a cationic group of the polyether-based polymer.

(3) Electric Conductivity

Electric conductivity was measured as below by use of a low resistivity meter (Lorentz-GP produced by Mitsubishi Chemical Analytech Co., Ltd., with a PSP probe as a 4-pin probe) in accordance with JIS K 7194. 1(one) g of a composition, serving as a sample, was pressed at a temperature of 100° C. to 150° C. under pressure of 0.1 MPa to 1.0 MPa so as to be formed into a thin film having a thickness of 100 μm to 500 μm. The composition in a form of a thin film was then cut into a 10 mm×10 mm square. A measuring sample was thus obtained. The measuring sample was fixed on an insulating board of the low resistivity meter. Then, the probe was pressed against the center of one of surfaces (A surface) of the measuring sample, and a voltage of 10 V was applied to the measuring sample so that a resistance value of the measuring sample was measured. Thereafter, in accordance with the resistance value thus measured, a size of the measuring sample, and a measured position of the measuring sample, electric conductivity (unit: S/cm) was calculated with the use of a calculation expression stored in the low resistivity meter. This measurement was similarly carried out with the other of the surfaces (B surface) of the measuring sample. The electric conductivity thus obtained for the A surface and the B surface was averaged. The averaged electric conductivity thus obtained is regarded as electric conductivity of the measuring sample.

(4) Mooney Viscosity

A value of Mooney viscosity [$ML_{1+4}$ (100° C.)] was measured in accordance with JIS K6300.

Production Example 1

Preparation of Catalyst Solution

Air in a sealed pressure-resistant glass container was replaced with nitrogen, and then 200 parts of toluene and 60 parts of triisobutylaluminum were added into the pressure-resistant glass container. After the glass bottle was cooled by being immersed in iced water, 230 parts of diethyl ether was added into the glass bottle, and a mixture thus obtained was stirred. Next, while the glass bottle was being cooled in iced water, 13.6 parts of phosphoric acid was added into the glass bottle, and the mixture was further stirred. During this, because pressure in the glass bottle was increased due to a reaction between triisobutylaluminum and phosphoric acid, the increased pressure was vented as appropriate. A reaction mixture thus obtained was aged in a water tank at 60° C. for one hour, so that a catalyst solution was obtained.

Production Example 2

Production of Polyether-Based Polymer Containing Epichlorohydrin Units 223.5 parts of epichlorohydrin, 27.5 parts of allyl glycidyl ether, 19.7 parts of ethylene oxide, and 2585 parts of toluene were added into an autoclave. Then, a content fluid thus obtained was heated to 50° C. under stirring in a nitrogen atmosphere. Thereafter, 11.6 parts of the catalyst solution, obtained in Production Example 1, was added into the content fluid, thereby initiating a reaction. From right after a start of the reaction, a solution in which 129.3 parts of ethylene oxide was dissolved in 302 parts of toluene was added into a reactant at a constant rate over five hours. Further, every 30 minutes after the start of the reaction, 6.2 parts of the catalyst solution was added into the reactant over five hours. Five hours later from the start of the reaction, 15 parts of water was added to and stirred with the reactant so that the reaction was terminated. Then, 45 parts of a 5% toluene solution of 4,4'-thiobis-(6-tert-buyl-3-methyl phenol) was added, as an anti-oxidizing agent, into a reaction solution thus obtained. After stirring the reaction solution, supernatant water was removed from the reaction solution by steam stripping, and the reaction solution was dried in vacuum drying at 60° C., so that 400 parts of a polyether-based polymer A in a solid state was obtained. $^1$H-NMR measurement was carried out with respect to the polyether-based polymer A to find the following a monomer composition ratio: 40 mol % of epichlorohydrin units, 56 mol % of ethylene oxide units, and 4 mol % of allyl glycidyl ether units. Further, a weight average molecular weight of the polyether-based polymer A was 890,000, and Mooney viscosity of the polyether-based polymer A was 60.

Production Example 3

Production of Polyether-Based Polymer Containing Imidazolium Group 181 parts of the polyether-based polymer A obtained in Production Example 2 and 1211 parts of toluene were added into a glass reactor vessel having a stirrer, and stirred at 50° C. for 12 hours so that the polyether-based polymer was dissolved in toluene. Next, 70 parts of methanol was added into the glass reactor vessel, and a mixture thus obtained was stirred for 15 minutes. Into the mixture, 93 parts of 1-methylimidazole was added. The mixture containing 1-methylimidazole was heated to 75° C. under stirring, and reacted at 75° C. for 96 hours. After 96 hours elapsed, a reaction solution thus obtained was cooled to 20° C. so that the reaction was terminated. By (i) removing a solvent from the reaction solution by use of steam so that a polymer component was solidified and (ii) drying the polymer component in vacuum, 192 parts of a polyether-based polymer B, in a solid state, was obtained in which part of chlorine atoms of the epichlorohydrin units of the polyether-based polymer A was replaced with methylimidazolium groups each having a chloride ion as a counter anion. The polyether-based polymer B thus obtained was measured in terms of a content ratio of the oxirane monomer units each having a cationic group (methylimidazolium group). The content ratio was 3.40 mol %. Further, a weight average molecular weight of the polyether-based polymer B was 900,000, and Mooney viscosity of the polyether-based polymer B was 70.

Production Example 4

Anion Exchange in Polyether-Based Polymer Containing Imidazolium Group 100 parts of the polyether-based polymer B obtained in Production Example 3, 35 parts of lithium(bistrifluoromethylsulfone)imide, 500 parts of toluene, 500 parts of methanol, and 50 parts of ion-exchange water were add into a glass reactor vessel having a stirrer. After those were reacted at 25° C. for three hours, a solvent was removed from a reaction solution thus obtained by use of steam and then residual lithium salt was washed away with hot water so that a polymer component was solidified. The polymer component was then dried in vacuum. As a result, 114 parts of a polyether-based polymer C was obtained. $^1$H-NMR measurement was carried out with respect to the polyether-based polymer C after the polyether-based polymer C was dissolved in dimethylsulfoxide-D6, whereby the following spectrum was obtained: $^1$H-NMR(400 MHz, DMSO-d6) δ=9.04-8.94(1H, MeIm$^+$), 7.65(2H, MeIm$^+$), 5.81(1H, H$_2$C=CHCH$_2$O), 5.23-5.08(2H, H$_2$C=CHCH$_2$O), 3.97(3H, MeIm$^+$), 3.90-3.10(5H, CH(CH$_2$O)CH$_2$O). From this spectrum, it is possible to identify the polyether-based polymer C as a polyether-based polymer in which all of chloride ions, serving as counter anions of the methylimidazolium groups of the polyether-based polymer B, are exchanged for (bistrifluoromethylsulfone)imide anions.

Example 1

In a sealable glass container, 90 parts of the polyether-based polymer C obtained in Production Example 4 was dissolved in 5000 parts of N,N-dimethylformamide. Next, into a solution thus obtained, 10 parts of a super-growth single-walled carbon nanotube (a single-walled carbon nanotube produced by National Institute of Advanced Industrial Science and Technology in accordance with a method disclosed in WO2006/011655, hereinafter referred to as "SGCNT") was added. The glass container was then placed in an ultrasonic cleaner (ultrasonic cleaner "USD-4R" produced by AS ONE Corporation, high-frequency output: 160 W), and subjected to an ultrasonic treatment at a frequency of 40 kHz and a temperature of 20° C. to 40° C. for 60 minutes so that the SGCNT was dispersed in the solution. Then, the glass container was opened, and a stirring bar was put in the glass container. The glass container was placed on an electromagnetic stirrer having a heating device in a state where the glass container was opened, and a content of the glass container was dried at a temperature of 30° C. and at 200 rpm until the stirring bar stopped revolving. After the stirring bar stopped revolving, the stirring bar was removed. The glass container was then placed in a vacuum dryer, and the content was further dried under 0.01 MPa or less at a temperature of 50° C. for 12 hours or more. A composition thus obtained was black. In a case where the composition was measured as a sample in terms of electric conductivity, the electric conductivity was 16.00 (S/cm).

Production Example 5

Living Anion Copolymerization of Epichlorohydrin and Glycidyl Methacrylate 3.22 parts of tetranormalbutylammonium bromide and 50 parts of toluene were added into a glass reactor vessel having a stirrer in which air was replaced with argon, and were cooled to 0(zero)° C. Next, a solution in which 1.37 parts of triethylaluminum (1.2 mol equivalent with respect to tetranormalbutylammonium bromide) was dissolved in 10 parts of n-hexane was added into the glass reactor vessel, and reacted with each other for 15 minutes. Then, by adding, into a catalyst composition thus obtained, 9.0 parts of epichlorohydrin and 1.0 part of glycidyl methacrylate, a polymerization reaction was started at 0(zero)° C. After the polymerization reaction was started, viscosity of the solution was gradually increased. After the polymerization reaction was carried out for 12 hours, a small amount of water was added to a polymerization reaction solution thus obtained so that the polymerization reaction was terminated. The polymerization reaction solution was subjected to deashing of a catalyst residue by being washed with a hydrochloric acid solution of 0.1 N. Then, the polymerization reaction solution was further washed with ion exchange water. Thereafter, an organic layer was dried at a temperature of 50° C. under reduced pressure for 12 hours. A colorless and transparent substance in an oil state thus obtained had a yield of 9.9 parts. Further, the colorless and transparent substance had number average molecular weight (Mn) of 1,100 by GPC and molecular weight distribution of 1.27. $^1$H-NMR measurement was carried out with respect to the colorless and transparent substance in an oil state, whereby the colorless and transparent substance in an oil state was found to contain 93.2 mol % of epichlorohydrin units and 6.8 mol % of glycidyl methacrylate units. From the perspective of the above finding, it can be said that the colorless and transparent substance in an oil state is an oligomer made up of epichlorohydrin units and glycidyl methacrylate units which oligomer has a bromomethyl group in its polymerization starting terminal and a hydroxyl group in its polymerization terminating terminal (i.e., undecamer made up of 10 epichlorohydrin units and 1 glycidyl methacrylate unit in average). Hereinafter, the colorless and transparent substance is referred to as an oligomer D.

Production Example 6

Quaternization Reaction of Epichlorohydrin Units of Copolymer by 1-Methylimidazole 5.0 parts of the oligomer D obtained in Production Example 5, 5.0 parts of 1-methylimidazole, and 10.0 parts of acetonitrile were added into a glass reactor vessel having a stirrer in which air was replaced with argon, and a mixture thus obtained was heated to 80° C. After the mixture was reacted at 80° C. for 72 hours, the mixture was cooled to a room temperature so that the reaction was terminated. Then, a product of the reaction was dried at 50° C. under reduced pressure for 120 hours. As a result, 8.8 parts of a purple solid was obtained. $^1$H-NMR measurement and an elemental analysis were carried out with respect to the purple solid, whereby the purple solid was identified as a polyether compound in which a content ratio of oxirane monomer units each having a cationic group (methylimidazolium group) was 93.2% and in which (i) all of chloro groups of epichlorohydrin units of oligomers, which served as a starting material, and (ii) all of bromo groups of bromomethyl groups at polymerization starting terminals of the oligomers were substituted with 1-methylimidazolium chloride groups and 1-methylimidazolium bromide groups, respectively. Hereinafter, the purple solid is referred to as a polyether compound E.

Production Example 7

Anion Exchange of Polyether Compound having a 1-methylimidazolium Chloride Group by lithium(bistrifluoromethylsulfone)imide 2.5 parts of the polyether compound E obtained in Production Example 6, 4.1 parts of lithium(bistrifluoromethylsulfone)imide, and 20 parts of methanol were added into a glass reactor vessel having a stirrer. After a mixture thus obtained was reacted at a room temperature for 30 minutes, a product of the reaction was dried at 50° C. under reduced pressure for one hour. A resulting solid-liquid mixture was washed with ion exchange water so that mineral salt was removed, and then dissolved in acetone. An acetone solution thus obtained was dried at 50° C. under reduced pressure for 12 hours, so that 5.1 parts of a viscous liquid material with pale purple was obtained. $^1$H-NMR measurement and an elemental analysis were carried out with respect to the viscous liquid material, whereby the viscous liquid material was identified as a polyether compound which has an imidazolium structure that has, as an counter anion, (bistrifluoromethylsulfone)imide anions and in which (i) all of chloride ions of the 1-methylimidazolium chloride groups in repeating units of the polyether compound, which was a starting material, and (ii) all of bromide ions of the 1-methylimidazolium bromide groups at a polymerization starting terminal of the polyether compound were exchanged for (bistrifluoromethylsulfone)imide anions. Hereinafter, the viscous liquid material is referred to as a polyether compound F.

Example 2

In a sealable glass container, 90 parts of the polyether compound E obtained in Production Example 6 was dissolved in 500 parts of ion exchange water. Next, after 10 parts of SGCNT was added into a solution thus obtained, the glass container was placed in an ultrasonic cleaner (ultrasonic cleaner "USD-4R" produced by AS ONE Corporation, high-frequency output: 160 W), and subjected to an ultrasonic treatment at a frequency of 40 kHz and a temperature of 20 to 40° C. for 60 minutes so that the SGCNT was dispersed in the solution. Then, the glass container was opened, and a stirring bar was put in the glass container. The glass container was placed on an electromagnetic stirrer having a heating device in a state where the glass container was opened, and then a content of the glass container was dried at a temperature of 30° C. and at 200 rpm until the stirring bar stopped revolving. After the stirring bar stopped revolving, the stirring bar was removed. The glass container was then placed in a vacuum dryer, and the content was further dried under 0.01 MPa or less at a temperature of 50° C. for 12 hours or more. A composition thus obtained was black. In a case where the composition was measured as a sample in terms of electric conductivity, the electric conductivity was 47.00 (S/cm).

Example 3

In a sealable glass container, 90 parts of the polyether compound F obtained in Production Example 7 was dissolved in 500 parts of N-N-dimethylformamide. Next, after 10 parts of SGCNT was added to a solution thus obtained, the glass container was placed in an ultrasonic cleaner (ultrasonic cleaner "USD-4R" produced by AS ONE Corporation, high-frequency output: 160W), and subjected to an ultrasonic treatment at a frequency of 40 kHz and a temperature of 20 to 40° C. for 60 minutes so that the SGCNT was dispersed in the solution. Then, the glass container was opened, and a stirring bar was put in the glass container. The glass container was placed on an electromagnetic stirrer having a heating device in a state where the glass container was opened, and then a content of the glass container was dried at a temperature of 30° C. and at 200 rpm until the stirring bar stopped revolving. After the stirring bar stopped revolving, the stirring bar was removed. The glass container was then placed in a vacuum dryer, and the content was further dried under 0.01 MPa or less at a temperature of 50° C. for 12 hours or more. A composition thus obtained was black. In a case where the composition was measured as a sample in terms of electric conductivity, the electric conductivity was 43.00 (S/cm).

Example 4

In a sealable glass container, 90 parts of the polyether compound F obtained in Production Example 7 and 3 parts of dicumylperoxide ("PERCUMYL (registered trademark) D-40" produced by NOF Corporation) serving as a cross-linking agent were dissolved in 500 parts of N-N-dimethylformamide. Next, after 10 parts of SGCNT was added into a solution thus obtained, the glass container was placed in an ultrasonic cleaner (ultrasonic cleaner "USD-4R" produced by AS ONE Corporation, high-frequency output: 160W), and then subjected to an ultrasonic treatment at a frequency of 40 kHz and a temperature of 20 to 40° C. for 60 minutes so that the SGCNT was dispersed in the solution. Then, the glass container was opened, and a stirring bar was put in the glass container. The glass container was placed on an electromagnetic stirrer having a heating device in a state where the glass container was opened, and then a content of the glass container was dried at a temperature of 30° C. and at 200 rpm until the stirring bar stopped revolving. After the stirring bar stopped revolving, the stirring bar was removed. The glass container was then placed in a vacuum dryer, and the content was further dried under 0.01 MPa or less at a temperature of 50° C. for 12 hours or more. A composition thus obtained was black. In a case where the composition was (i) formed into a thin cylinder having a diameter of 12 mm and a thickness of 200 micron and (ii) held in an oven at 160° C. for 20 minutes so as to undergo a cross-linking reaction, the composition resulted in a cross-linked material in a rubber state. In a case where the cross-linked material was measured in terms of a shape retaining property, the cross-linked material was able to retain its shape in N,N-dimethylformamide. Further, in a case where the cross-linked material was measured as a sample in terms of electric conductivity, the electric conductivity was 31.00 (S/cm).

Comparative Example

A composition was obtained in a manner similar to that in Examples, except that the polyether-based polymer A obtained in Production Example 2 was used instead of the polyether-based polymer C. The composition thus obtained was black. Further, in a case where the composition was measured as a sample in terms of electric conductivity, the electric conductivity was 3.20 (S/cm).

The invention claimed is:

1. A composition comprising a polyether-based polymer and a nano-carbon material, the polyether-based polymer containing oxirane monomer units at least part of which are oxirane monomer units each having a cationic group, wherein the oxirane monomer units each having a cationic group of the polyether-based polymer are each a unit represented by the following formula (1):

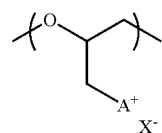 (1)

where $A^+$ is a cationic group or a cationic group containing group, and $X^-$ is a counter anion, and wherein all the monomer units of the polyether-based polymer contain an oxirane unit.

2. The composition as set forth in claim 1, wherein the nano-carbon material is a carbon nanotube, and has a specific surface area of 600 $m^2/g$ or more and 2,500 $m^2/g$ or less.

3. The composition as set forth in claim 1, wherein the ratio of the oxirane monomer units each having a cationic group to the total number of oxirane monomer units is in a range of 2 mol % to 100 mol %.

4. The composition as set forth in claim 1, wherein the ratio of the oxirane monomer units each having a cationic group to the total number of oxirane monomer units is in a range of 3 mol % to 100 mol %.

5. The composition as set forth in claim 2, wherein the ratio of the oxirane monomer units each having a cationic group to the total number of oxirane monomer units is in a range of 2 mol % to 100 mol %.

6. The composition as set forth in claim 2, wherein the ratio of the oxirane monomer units each having a cationic group to the total number of oxirane monomer units is in a range of 3 mol % to 100 mol %.

* * * * *